(12) United States Patent
Yang et al.

(10) Patent No.: US 9,622,137 B2
(45) Date of Patent: Apr. 11, 2017

(54) APPARATUS AND METHOD FOR SELECTING HO TRIGGERS

(71) Applicant: Telefonaktiebolaget L M Ericsson (publ), Stockholm (SE)

(72) Inventors: Yu Yang, Solna (SE); Konstantinos Dimou, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 241 days.

(21) Appl. No.: 13/914,081

(22) Filed: Jun. 10, 2013

(65) Prior Publication Data

US 2013/0331103 A1 Dec. 12, 2013

Related U.S. Application Data

(60) Provisional application No. 61/658,180, filed on Jun. 11, 2012.

(51) Int. Cl.
*H04W 36/26* (2009.01)
*H04W 36/00* (2009.01)

(52) U.S. Cl.
CPC ....... *H04W 36/26* (2013.01); *H04W 36/0083* (2013.01)

(58) Field of Classification Search
CPC .................................................. H04W 36/26
See application file for complete search history.

(56) References Cited

U.S. PATENT DOCUMENTS

2003/0069018 A1* 4/2003 Matta et al. ................. 455/436
2010/0080193 A1* 4/2010 Sakai ........................... 370/332
2010/0273487 A1 10/2010 Alonso-Rubio et al.
2012/0088509 A1 4/2012 Yi
2012/0214501 A1 8/2012 Johannson et al.
2012/0282931 A1* 11/2012 Giustina et al. .............. 455/437
2013/0053092 A1 2/2013 Laitinen et al.
2013/0065632 A1 3/2013 Macias et al.
2013/0143578 A1* 6/2013 Lekutai ........................ 455/444
(Continued)

FOREIGN PATENT DOCUMENTS

EP 1998583 A1 12/2008
EP 2605585 A1 6/2013
(Continued)

OTHER PUBLICATIONS

Kürner, T., et al., "Final Report on Self-Organisation and its Implications in Wireless Access Networks", INFSO-ICT-216284 SOCRATES D5.9, Dec. 31, 2010, pp. 1-135, retrieved on Nov. 20, 2013, retrieved from internet: www.fp7-socrates.org.
(Continued)

*Primary Examiner* — Mazda Sabouri
(74) *Attorney, Agent, or Firm* — Coats & Bennett, PLLC

(57) ABSTRACT

The disclosed solution dynamically selects a handover trigger for triggering handover of a mobile terminal in a wireless network from a source base station to a target base station based on one or more Key Performance Indicators (KPIs). Each KPI indicates a quality of wireless services provided by the wireless network responsive to a particular handover trigger. A trigger selection circuit selects one of multiple candidate triggers as the handover trigger based on a comparison between corresponding KPIs for different ones of the candidate triggers.

18 Claims, 4 Drawing Sheets

(56) References Cited

U.S. PATENT DOCUMENTS

| | | |
|---|---|---|
| 2013/0189996 A1 | 7/2013 | Sridhar et al. |
| 2013/0223403 A1 | 8/2013 | Chen et al. |
| 2014/0200004 A1* | 7/2014 | Wegmann et al. ........... 455/436 |

FOREIGN PATENT DOCUMENTS

| | | |
|---|---|---|
| WO | 2010110705 A1 | 9/2010 |
| WO | 2012150880 A1 | 11/2012 |

OTHER PUBLICATIONS

3rd Generation Partnership Project, "3rd Generation Partnership Project; Technical Specification Group Radio Access Network; Evolved Universal Terrestrial Radio Access (E-UTRA); Radio Resource Control (RRC); Protocol specification (Release 10)", Technical specification, 3GPP TS 36.331 V10.5.0, Mar. 1, 2012, pp. 1-302, 3GPP, France.

Dimou, K., et al., "Handover within 3GPP LTE: Design Principles and Performance", 2009 IEEE 70th Vehicular Technology Conference Fall, Sep. 20, 2009, pp. 1-5, IEEE.

* cited by examiner

APPARATUS AND METHOD FOR SELECTING HO TRIGGERS

This application claims priority to Provisional U.S. Patent Application No. 61/658,180 filed 11 Jun. 2012, which is incorporated herein by reference.

The solution disclosed herein relates generally to wireless communications, and more particularly to the selection of handover triggers.

BACKGROUND

During handover of a mobile terminal in a wireless communication network, control of an ongoing wireless communication session involving the mobile terminal is transferred from one network node, e.g., a source base station, to another network node, e.g., a target base station. Handover is performed as the mobile terminal moves out of the area covered by the source base station and into the area covered by the target base station.

Wireless networks typically use handover triggers to initiate or trigger handover of the mobile terminal from the source base station to the target base station. Both simulation results and field trials show that the optimal handover trigger substantially reduces the handover failure rate and improves system and service performance. Thus, overall performance of the wireless communication network relies on the careful choice of the handover trigger(s). This is particularly true for networks associated with different access technologies and/or standards (e.g., heterogeneous networks), where the wrong handover trigger causes more pronounced problems than in homogeneous networks.

SUMMARY

The solution disclosed herein dynamically selects a handover trigger for triggering handover of a mobile terminal in a wireless network from a source base station to a target base station based on one or more Key Performance Indicators (KPIs). Each KPI indicates a quality of wireless services provided by the wireless network responsive to a particular handover trigger. Exemplary KPIs include, but are not limited to, a number of handover failures, a number of ping-pong handovers, a measurement of a time period where the mobile terminal is not in a preferred cell, a number of handover initiations, a service performance parameter, a Reference Signal Received Power (RSRP), a Signal-plus-Interference to Noise Ratio (SINR), a Signal-to-Noise Ratio (SNR), a handover delay, and a Voice over Internet Protocol (VoIP) performance parameter that results from or is otherwise associated with a particular handover trigger.

According to one exemplary method, a first KPI is obtained for each of a first candidate trigger and a second candidate trigger, where each first KPI indicates, for the corresponding candidate trigger, a quality of wireless services provided by the wireless network to the mobile terminal. The method includes selecting one of the first and second candidate triggers as the handover trigger based on a first comparison between the first KPIs for the first and second candidate triggers. For example, the candidate trigger associated with a better performing one of the first KPIs may be selected when a difference between the first KPIs exceeds a predetermined margin.

According to one exemplary embodiment, a network node determines the handover trigger. In this exemplary embodiment, the network node comprises a KPI circuit and a trigger selection circuit. The KPI circuit is configured to obtain a first KPI for each of a first candidate trigger and a second candidate trigger, where each first KPI indicates, for the corresponding candidate trigger, a quality of wireless services provided by the wireless network to the mobile terminal. The trigger selection circuit is configured to select one of the first and second candidate triggers as the handover trigger based on a first comparison between the first KPIs for the first and second candidate triggers. In one exemplary embodiment, the network node comprises the source base station, where the KPI circuit obtains the first KPI by receiving the first KPI from the mobile terminal for each of the first and second candidate triggers, and/or by determining the first KPI for each of the first and second candidate triggers. In another exemplary embodiment, the network node comprises the mobile terminal, where the KPI circuit in the mobile terminal obtains the first KPI by receiving the first KPI from the source base station for each of the first and second candidate triggers, and/or by determining the first KPI for each of the first and second candidate triggers.

DETAILED DESCRIPTION

Figure 1:
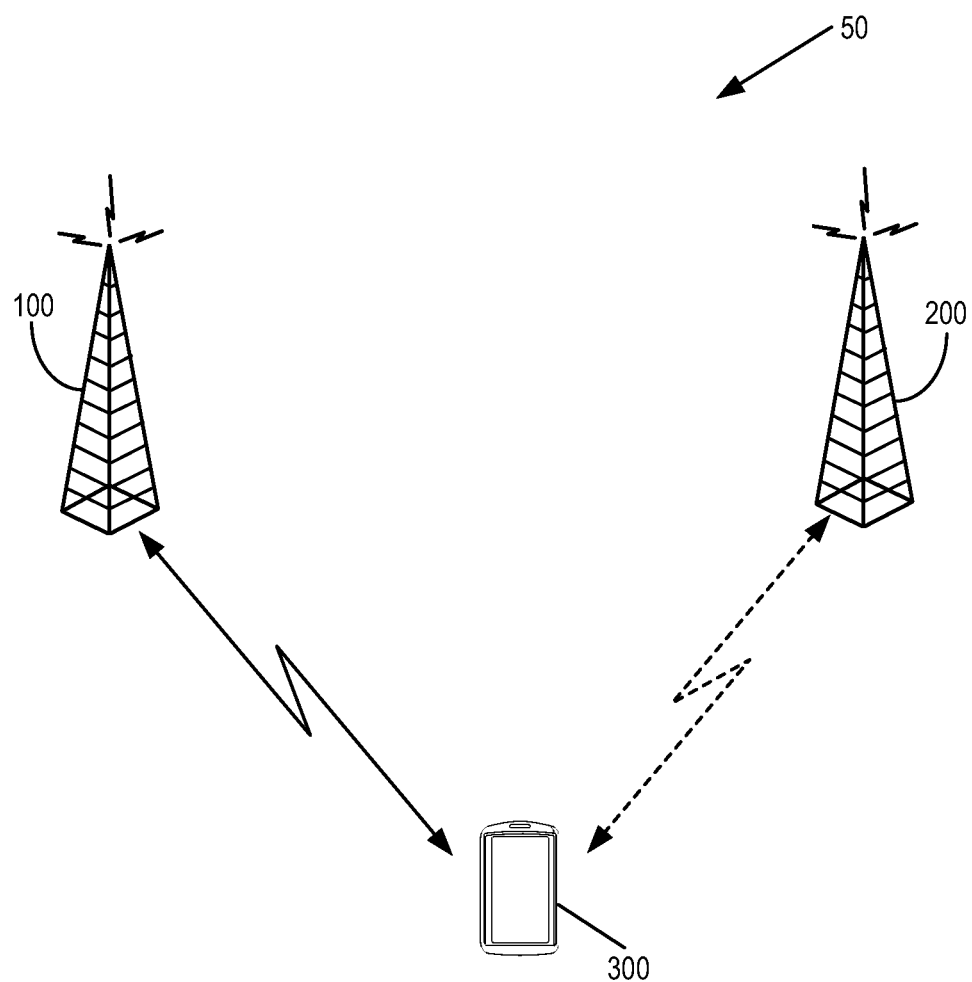
FIG. 1 shows a wireless communication network.

FIG. 1 shows the main elements of an exemplary wireless network 50 involved in a handover of a mobile terminal 300 from a source base station 100 to a target base station 200. As used herein, the wireless network 50 may comprise any network that provides wireless services according to any known wireless protocol, including but not limited to Long Term Evolution (LTE). As used herein, the base stations 100, 200 may comprise any access point for the mobile terminal within the wireless network 50, e.g., a NodeB, an eNodeB, etc. As used herein, the mobile terminal 100 may comprise any portable/movable device that includes a wireless transceiver for communicating within the wireless network 50, e.g., a cellular telephone, tablet computer, laptop computer, automobile computer, etc. As long as the mobile terminal 300 is within the cell or area covered by the source base station 100, the source base station 100 controls some or all communications to and from the mobile terminal 300. As the mobile terminal 300 moves within the network, e.g., towards the target base station 200, the mobile terminal 300 moves out of the coverage area of the source base station 100. As a result, the overall quality of the wireless communications between the source base station 100 and the mobile terminal 300 will deteriorate. In such scenarios, handover of the mobile terminal 300 to the target base station 200 prevents the mobile terminal 300 from experiencing a loss of wireless service.

Handover triggers may be used to facilitate the decision as to whether to handover a mobile terminal. If a handover trigger causes handover to occur more often than necessary, system performance may suffer. If a handover trigger causes handover to occur less often than necessary, service performance associated with individual mobile terminals may suffer. Thus, it is critical to choose a handover trigger that carefully balances system performance, service performance, and other wireless parameters, e.g., a desired handover failure rate. Conventional systems attempt to achieve this balance by using a fixed handover trigger predetermined based on expected network conditions, expected network parameters, desired performance goals, etc. Because the performance of a handover trigger fluctuates based on various performance parameters, however, such fixed handover triggers cannot effectively or optimally deal with all handover situations. For example, optimal handover triggers tend to vary with the source/target cell size, source/target cell load, mobile terminal speed, etc.

Embodiments of the solution disclosed herein dynamically select a handover trigger based on one or more Key Performance Indicators (KPIs), where each KPI indicates a quality of wireless services provided by the wireless network 50 responsive to a particular handover trigger. Exemplary KPIs include, but are not limited to, a number of handover failures, a number of ping-pong handovers, a measurement of a time period where the mobile terminal is not in a preferred cell, a number of handover initiations, service performance parameters (e.g., packet delay, packet error rate), a Reference Signal Received Power (RSRP), a Signal-plus-Interference to Noise Ratio (SINR), a Signal-to-Noise Ratio (SNR), a handover delay (e.g., the time difference between the time instant the handover decision is made at the serving base station to the time instant the mobile terminal acknowledges receipt of a handover command message), and a Voice over Internet Protocol (VoIP) performance parameter that results from or is otherwise associated with a particular handover trigger. These KPIs may be determined by or may be available at the mobile terminal, the source base station, and/or another network node. By dynamically selecting the handover trigger based on the KPIs, the handover trigger more accurately accounts for variable network parameters. As a result, the solution presented herein reduces the handover failure rate, and improves system and service performances.

Figure 2:
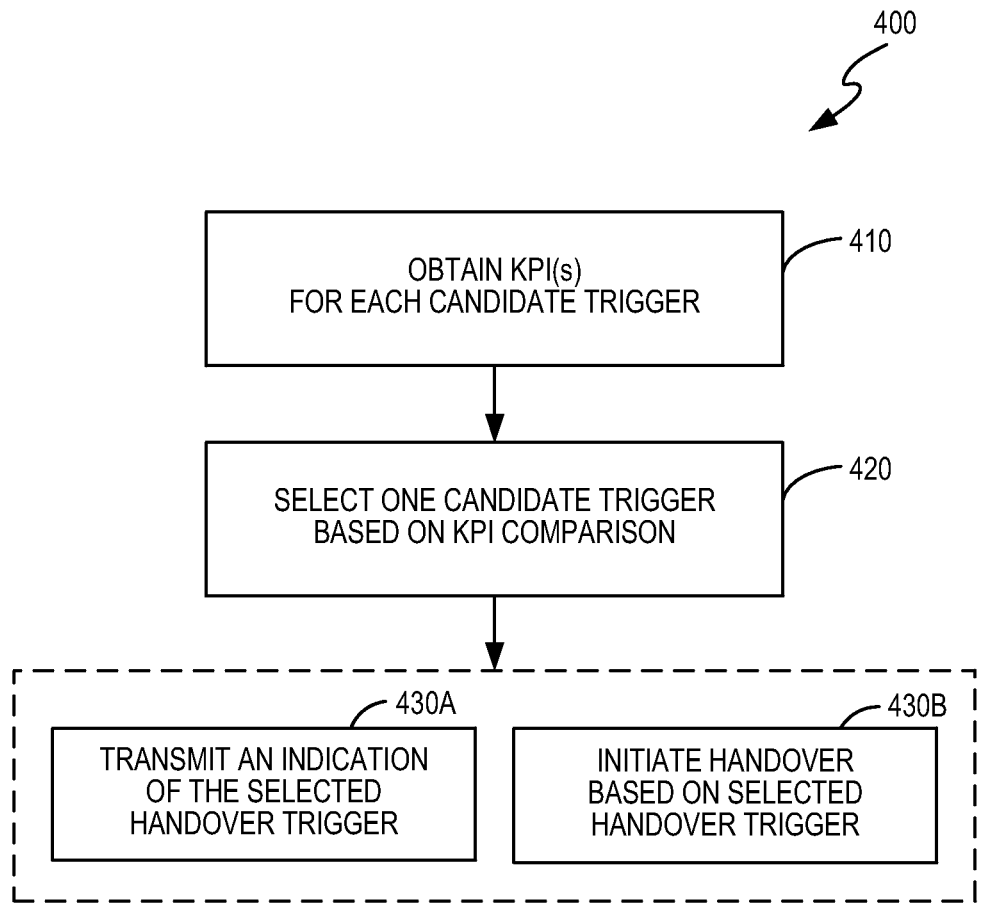
FIG. 2 shows a method according to one exemplary embodiment.

FIG. 2 shows an exemplary method 400 for dynamically selecting a handover trigger for triggering handover of the mobile terminal 300 from a source base station 100 to a target base station 200. The selected handover trigger represents one or multiple conditions, which if satisfied, will trigger a handover, from a source base station 100 to a target base station 200, of one or more communication sessions associated with mobile terminal 300. Depending on the configuration of wireless network 50, satisfaction of the selected handover trigger may be sufficient to trigger a handover, or the selected trigger may represent a subset of the conditions considered when a handover is triggered. For example, in particular embodiments, the selected handover trigger represents one or both of a hysteresis value and a time to trigger (TTT) value. In such embodiments, a handover is triggered when a signal strength measurement (e.g., RSRP) for a target base station 200 exceeds a signal strength measurement for a source base station 100 by more than an amount indicated by the hysteresis value for longer than a period of time indicated by the TTT value.

The method includes obtaining at least one KPI for each of a first candidate trigger and a second candidate trigger (block 410). Based on one or more comparisons between the corresponding KPIs for each candidate trigger, the method comprises selecting one of the candidate triggers as the handover trigger (block 420). For example, assume one KPI is obtained for each of two candidate triggers, e.g., $KPI_A$ and $KPI_B$. In this example, the candidate trigger associated with a better one of $KPI_A$ and $KPI_B$ when a difference between the KPIs $|KPI_A - KPI_B|$ exceeds a predetermined margin may be selected as the handover trigger. Depending on which node is responsible for selecting the handover trigger, the exemplary method 400 may also include transmitting an indication of the selected handover trigger between nodes, e.g., transmitting the selected candidate trigger from a base station responsible for selecting the handover trigger to a mobile terminal 300. For example, when source base station 100 is responsible for selecting the handover trigger, the method 400 may further include the transmission of an indication of the selected handover trigger from the source base station 100 to the mobile terminal 300 (optional block 430A).

Additionally or alternatively, exemplary method 400 may include mobile terminal 300 (or another suitable component of wireless network 50) initiating handover of a communication session associated with mobile terminal 300 between a source base station 100 and target base station 200, based on the selected handover trigger (optional block 430B). For example, as explained above, the selected handover trigger may represent or include a hysteresis value and a TTT value in particular embodiments. In such embodiments, mobile terminal 300 may detect that a signal strength measurement for target base station 200 exceeds a signal strength measurement for source base station 100 by more than an amount indicated by the hysteresis value of the selected handover trigger for longer than a period of time indicated by the TTT value of the selected handover trigger. In response to detecting this, mobile terminal 300 may notify source base station 100 of its handover decision or otherwise request that source base station 100 perform a handover.

Figure 3:
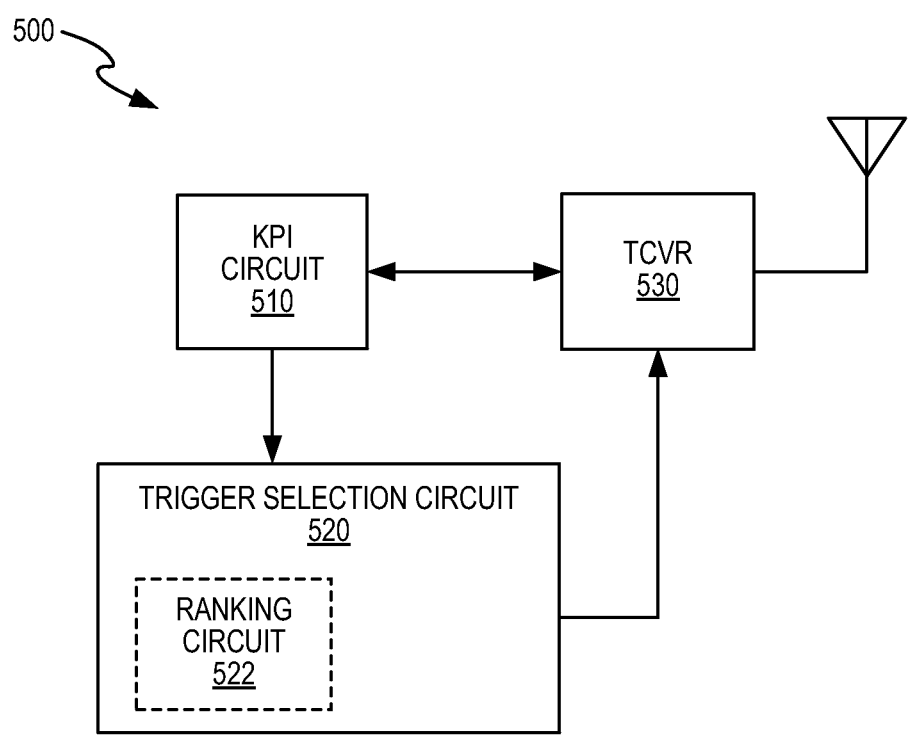
FIG. 3 shows a block diagram of a network node according to one exemplary embodiment.

FIG. 3 shows an exemplary network node 500 for executing the method of FIG. 2. As discussed further herein, the network node 500 may comprise a base station 100, 200 or the mobile terminal 300. The network node 500 comprises a KPI circuit 510, a trigger selection circuit 520, and a transceiver 530. KPI circuit 510 is configured to obtain the KPI(s) for each candidate trigger. The trigger selection circuit 520 is configured to select one of the candidate triggers as the handover trigger based on a comparison between the KPIs. The trigger selection circuit 520 optionally includes a ranking circuit 522, explained further herein. Other elements not explicitly shown in FIG. 3 may also be present in the network node 500, e.g., a network interface, memory, signal processing circuitry, etc.

In one embodiment, the network node 500 comprises the mobile terminal 300, where the KPI circuit 510 obtains the KPIs for each candidate trigger by receiving the KPIs from the source base station 100 via the transceiver 530, e.g., using Radio Resource Control (RRC) messages. In another embodiment, the network node 500 comprises the mobile terminal 300, where the KPI circuit 510 obtains the KPIs by determining the KPIs for at least one candidate trigger. For example, the mobile terminal 300 may measure the RSRP, SNR, and/or SINR and associate the measured RSRP, SNR, SINR (or an average of multiple measurements) with the current handover trigger being used by the mobile terminal 300. The mobile terminal 300 may store the determined KPI for the current handover trigger so that the determined KPI may be available to the mobile terminal 300 for comparison with another like KPI obtained at a later time. The data used to determine the KPIs may be stored in the mobile terminal 300 or somewhere else in the network. In yet another embodiment, a KPI circuit 510 in the mobile terminal 300 obtains the KPIs for each candidate trigger by receiving some KPIs from the source base station 100, and by determining the rest of the KPIs at the mobile terminal 300. In all cases, the trigger selection circuit 520 selects the handover trigger based on the obtained KPIs.

In another embodiment, the network node 500 comprises the source base station 100, where the KPI circuit 510 obtains the KPIs for each candidate trigger by receiving the KPIs from the mobile terminal 300 via the transceiver 530. For example, a transceiver in the mobile terminal 100 may signal the KPIs to the source base station using an appropriately defined RRC polling message. In another embodiment, the network node 500 comprises the source base station 100, where the KPI circuit 510 obtains the KPIs for each candidate trigger by determining the KPIs for each candidate trigger. For example, the source base station 100 may determine the number of ping-pong handovers for each of the candidate triggers from statistics stored in the network, or may measure the RSRP each candidate trigger. The data used to determine the KPIs may be stored in the source base station 100, in the mobile terminal 300, or somewhere else in the network. In yet another embodiment, a KPI circuit 510 in the source base station 100 obtains the KPIs for each candidate trigger by receiving some KPIs from the mobile terminal 300, and by determining the rest of the KPIs at the source base station 100. The trigger selection circuit 520 selects the handover trigger based on the obtained KPIs, and the transceiver 530 transmits the selected handover trigger to the mobile terminal 300, e.g., using RRC messages.

The trigger selection circuit 520 selects the handover trigger based on a comparison between the obtained KPIs. For example, assume the KPI circuit 510 obtains a KPI for each of two candidate triggers, e.g., $KPI_A$ and $KPI_B$. In this example, the trigger selection circuit 520 may be configured to select the candidate trigger associated with a better one of $KPI_A$ and $KPI_B$ when a difference between the KPIs $|KPI_A - KPI_B|$ exceeds a predetermined margin as the handover trigger. If the difference does not exceed the predetermined margin, the trigger selection circuit 520 may select a default trigger as the handover trigger, e.g., the current handover trigger being used by the mobile terminal 300, a predetermined default trigger stored in a memory, etc.

Figure 4:
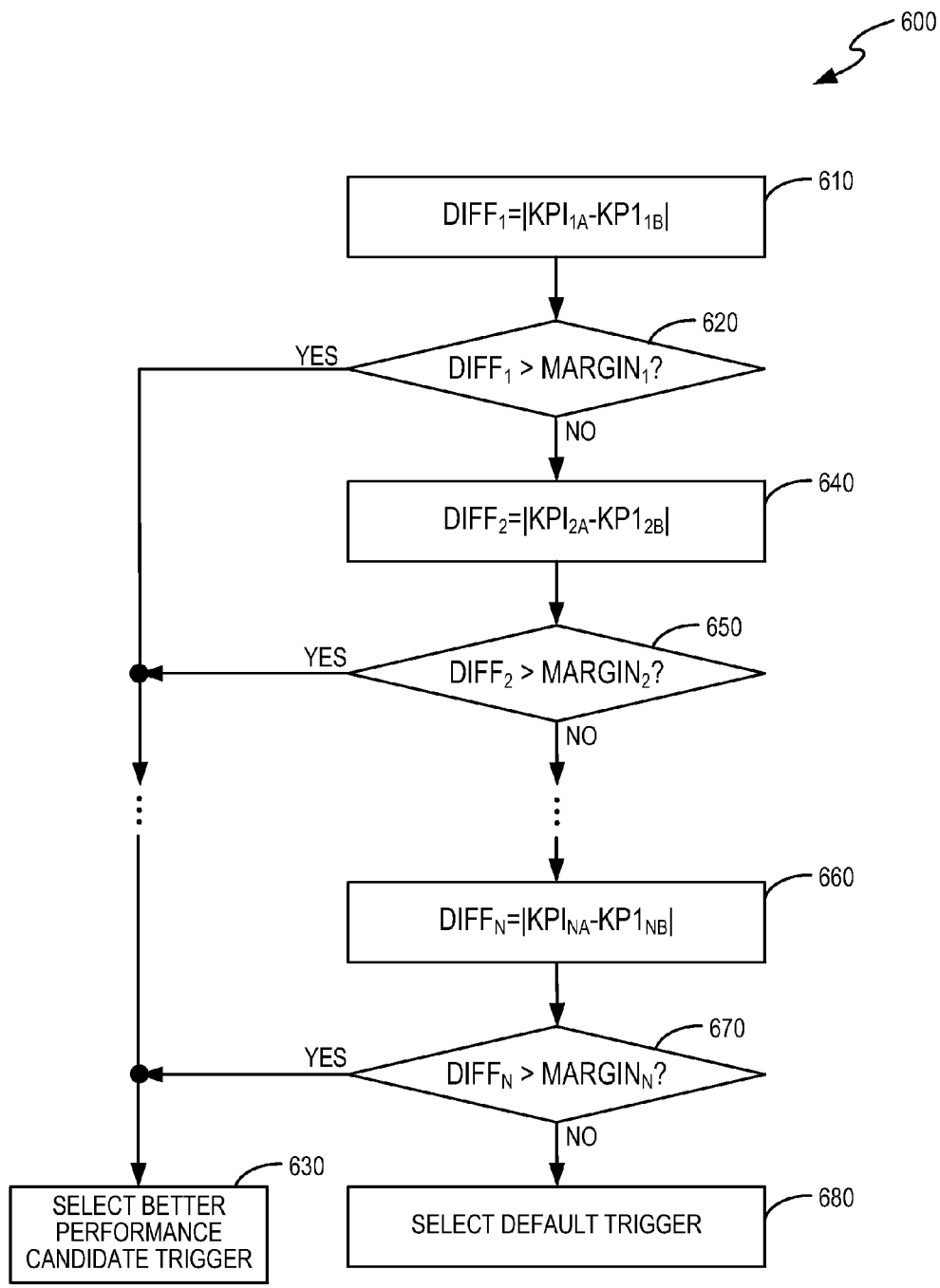
FIG. 4 shows a method according to one exemplary embodiment.

Each candidate trigger may be associated with more than one KPI, and that multiple KPIs may be used to select the handover trigger. FIG. 4 shows an exemplary method 600 where there are N KPIs for each of two candidate triggers, e.g., $KPI_{nA}$ for a first candidate trigger and $KPI_{nB}$ for a second candidate trigger, where n=1, . . . , N. To determine the handover trigger, the trigger selection circuit 520 performs one or more KPI comparisons, e.g., by determining a difference between two corresponding KPIS according to:

$$DIFF_n = |KPI_{nA} - KPI_{nB}|. \quad (1)$$

Equation (1) uses the absolute value to ensure that the difference has a positive value. The trigger selection circuit 520 subsequently makes the selection based on the set of KPIs associated with the first difference to exceed a predetermined margin.

More particularly, the trigger selection circuit 520 determines a first difference $DIFF_1$ between a first pair of KPIs ($KPI_{1A}$ and $KPI_{1B}$) according to Equation (1), where n=1 (block 610), and determines if $DIFF_1$ exceeds a predetermined margin $MARGIN_1$ (block 620). If $DIFF_1 > MARGIN_1$ (block 620), the trigger selection circuit 520 selects the better performing candidate trigger, e.g., the candidate trigger associated with the better one of $KPI_{1A}$ and $KPI_{1B}$ (block 630). For example, if $KPI_{1A}$ and $KPI_{1B}$ represent a signal-to-noise ratio for the respective candidate triggers, the trigger selection circuit will select the candidate trigger associated with the largest signal-to-noise ratio as the handover trigger when $DIFF_1 > MARGIN_1$. If $DIFF_1 \leq MARGIN_1$ (block 620), however, the trigger selection circuit determines the difference $DIFF_2$ between the next pair of KPIs (block 640), and determines if $DIFF_2$ exceeds a second predetermined margin (block 650). If $DIFF_2 > MARGIN_2$ (block 650), the trigger selection circuit 520 selects the better performing candidate trigger, e.g., the candidate trigger associated with the better one of $KPI_{2A}$ and $KPI_{2B}$ (block 630). For example, if $KPI_{2A}$ and $KPI_{2B}$ represent a number of handover failures or a handover failure rate for the respective candidate triggers, the trigger selection circuit 520 will select the candidate trigger associated with the smallest number of handover failures or the smallest handover failure rate as the handover trigger when $DIFF_2 > MARGIN_2$. If $DIFF_2$ $MARGIN_2$ (block 650), however, the trigger selection circuit 520 moves on to the next pair of KPIs. This process continues for each pair of KPIs until the trigger selection circuit 520 finds a pair of KPIs having a difference exceeding a predetermined margin, or until the trigger selection circuit determines the difference $DIFF_N$ for the last pair of KPIs (block 660) and determines that $DIFF_N \leq MARGIN_N$ (block 670). In that scenario, the trigger selection circuit 520 may select a default trigger (block 680). For example, the default handover trigger may comprise a current handover trigger currently used by the mobile terminal 300.

In some embodiments, trigger selection circuit 520 executes the KPI comparisons according to some random order. In other embodiments, the trigger selection circuit 520 may rank the KPIs and sequentially execute the KPI comparisons in the order defined by the ranking. In this embodiment, the trigger selection circuit 20 may comprise a ranking circuit 522 configured to rank each pair of KPIs based on a preferred emphasis in descending order. For example, when the handover failure rate has been determined to be the most important parameter, followed by the signal-to-noise ratio (SNR), and then the reference signal received power (RSRP), the ranking circuit 522 may rank the pair of handover failure rate KPIs higher than the pair of SNR KPIs, which are ranked higher than the pair of RSRP KPIs. The trigger selection circuit 520 then executes the process of FIG. 4 according to this ranking, such that blocks 610 and 620 deal with the handover failure rate KPIs, blocks 640 and 650 deal with the SNR KPIs, and blocks 660 and 670 deal with the RSRP KPIs.

While the embodiments and examples disclosed herein present the solution in terms of two candidate triggers, any number of candidate triggers may be used. For example, one or more KPIs may be obtained for each of three or more candidate triggers, where each set of KPIs comprises a KPI corresponding to the same parameter for a different candidate trigger. The trigger selection circuit 520 selects the handover trigger based on a comparison between the KPIs in a set of KPIs. In one embodiment, the comparisons may comprise simultaneous comparisons of all of the KPIs in a set of KPIs, e.g., all of the SNR KPIs. Alternatively, the comparison may comprise multiple evaluations/comparisons of subsets of the set of KPIs, e.g., subsets of the SNR KPIs.

The trigger selection algorithms disclosed herein may be performed simultaneously at the mobile terminal 300 and the source base station 100. This enables the mobile terminal 300 and the source base station 100 to be aware of the selected handover trigger without requiring explicit signaling to convey such information. To implement such simultaneous selection operations, the KPI information available only to the mobile terminal 300 must be made available to the source base station 100, and vice versa.

In some embodiments, the source base station 100 may store the KPIs and the corresponding candidate triggers so as to create a database of information regarding the handover performance associated with different triggers. While the information in such a database may vary from base station to base station, some or all of the database information may be exchanged and/or shared among base stations, e.g., using an X2 or S1 interface. Such an exchange of information may be used to assist with initial handover settings and/or for handover trigger selection.

The solution disclosed herein enables handover performance to be evaluated from a comprehensive viewpoint. The performance can be evaluated automatically, both at the mobile terminal and at the network, such that the handover triggers may be dynamically adapted and adjusted to get a good handover performance. Thus, the solution disclosed herein reduces the handover failure rate as well as improves system and service performance.

The KPI circuit 510, trigger selection circuit 520, and/or ranking circuit 522 may be implemented in hardware, software, In all embodiments, the functionality provided by the described "circuits" in the drawing figures, e.g., the KPI circuit 510, trigger selection circuit 520, ranking circuit 522, etc., may more generally be implemented as dedicated hardware circuits (either analog or digital) as in the example of FIG. 3; as programmable logic together with appropriate firmware; as software modules executed on one or more stored-program processors or digital signal processors (DSP); or in any combination thereof. Additionally, each of the described circuits may represent, in part or in whole, the same physical components as one or more of the other circuits. Thus, for example, KPI circuit 510, trigger selection circuit 520, and ranking circuit 522 may, in some embodiments, all represent a single circuit or a common set of circuits while, in other embodiments, they may each represent separate independent circuits.

In all embodiments, the transceiver 530 may comprise a receiver and transmitter interface used to communicate with one or more other transceivers via a Radio Access Network according to one or more communication protocols known in the art or that may be developed, e.g., IEEE 802.xx, CDMA, WCDMA, GSM, LTE, UTRAN, WiMax, or the like. The transceiver 530 implements transmitter and receiver functionality appropriate to the Radio Access Network links (e.g., frequency allocations and the like). The transmitter and receiver functions may share circuit components and/or software, or alternatively may be implemented separately.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of determining a handover trigger for triggering handover of a mobile terminal in a wireless network from a source base station to a target base station, the method comprising:
    obtaining a first Key Performance Indicator (KPI) for each of a first candidate trigger and a second candidate trigger, wherein each first KPI indicates, for the corresponding candidate trigger, a quality of wireless services provided by the wireless network to the mobile terminal;
    obtaining a second KPI for each of the first and second candidate triggers; and
    selecting one of the first and second candidate triggers as the handover trigger based on at least one of a first comparison between the first KPIs for the first and second candidate triggers and a second comparison between the second KPIs for the first and second candidate triggers by:
        selecting, as the handover trigger, the candidate trigger associated with a better one of the first KPIs if a first difference between the first KPIs exceeds a first predetermined margin; and
        if the first difference does not exceed the first predetermined margin, selecting, as the handover trigger, the candidate trigger associated with a better one of the second KIPs if a second difference between the second KPIs exceeds a second predetermined margin;
    wherein the mobile terminal uses the selected handover trigger to initiate the handover of the mobile terminal from the source base station to the target base station.

2. The method of claim 1 further comprising, if neither the first difference nor the second difference exceed the respective first and second predetermined margins, selecting a default trigger as the handover trigger.

3. The method of claim 2 wherein the default trigger comprises a current handover trigger currently used by the mobile terminal to trigger handover.

4. The method of claim 1:
    further comprising ranking the first and second KPIs based on a preferred emphasis on one of the first and second KPIs;
    wherein selecting one of the first and second candidate triggers comprises:
        sequentially executing at least one of the first and second comparisons according to the ranking; and
        selecting, as the handover trigger, one of the first and second candidate triggers based on one or more of the sequentially executed first and second comparisons.

5. The method of claim 1 wherein the first KPI comprises one of a number of handover failures, a number of ping-pong handovers, a measurement of a time period where the mobile terminal is not in a preferred cell, a number of handover initiations, a service performance parameter, a Reference Signal Received Power (RSRP), a Signal-plus-Interference to Noise Ratio (SINR), a Signal-to-Noise Ratio (SNR), a handover delay, and a Voice over Internet Protocol (VoIP) performance parameter.

6. The method of claim 1:
    wherein obtaining the first KPI comprises receiving the first KPI at the source base station from the mobile terminal for each of the first and second candidate triggers; and
    wherein selecting one of the first and second candidate triggers comprises the source base station selecting one of the first and second candidate triggers as the handover trigger based on the first comparison;
    the method further comprising sending the selected handover trigger to the mobile terminal.

7. The method of claim 1:
    wherein obtaining the first KPI comprises determining the first KPI at the source base station for each of the first and second candidate triggers; and
    wherein selecting one of the first and second candidate triggers comprises the source base station selecting one of the first and second candidate triggers as the handover trigger based on the first comparison;
the method further comprising sending the selected handover trigger to the mobile terminal for use by the mobile terminal to initiate the handover of the mobile terminal from the source base station to the target base station.

8. The method of claim 1 wherein:
obtaining the first KPI comprises receiving the first KPI at the mobile terminal from the source base station for each of the first and second candidate triggers; and
selecting one of the first and second candidate triggers comprises the mobile terminal selecting one of the first and second candidate triggers as the handover trigger based on the first comparison; and
wherein the method further comprises initiating, based on the selected handover trigger, handover of a communication session associated with the mobile terminal from the source base station to the target base station.

9. The method of claim 1 wherein:
obtaining the first KPI comprises determining the first KPI at the mobile terminal for each of the first and second candidate triggers; and
selecting one of the first and second candidate triggers comprises the mobile terminal selecting one of the first and second candidate triggers as the handover trigger based on the first comparison; and
wherein the method further comprises initiating, based on the selected handover trigger, handover of a communication session associated with the mobile terminal from the source base station to the target base station.

10. A network node configured to determine a handover trigger for triggering handover of a mobile terminal in a wireless network from a source base station to a target base station, the network node comprising:
a Key Performance Indicator (KPI) circuit configured to:
obtain a first KPI for each of a first candidate trigger and a second candidate trigger, wherein each first KPI indicates, for the corresponding candidate trigger, a quality of wireless services provided by the wireless network to the mobile terminal; and
obtain a second KPI for each of the first and second candidate triggers; and
a trigger selection circuit configured to select one of the first and second candidate triggers as the handover trigger based on at least one of a first comparison between the first KPIs for the first and second candidate triggers and a second comparison between the second KPIs for the first and second candidate triggers by:
selecting, as the handover trigger, the candidate trigger associated with a better one of the first KPIs if a first difference between the first KPIs exceeds a first predetermined margin; and
if the first difference does not exceed the first predetermined margin, selecting, as the handover trigger, the candidate trigger associated with a better one of the second KIPs if a second difference between the second KPIs exceeds a second predetermined margin;
wherein the mobile terminal uses the selected handover trigger to initiate the handover of the mobile terminal from the source base station to the target base station.

11. The network node of claim 10 wherein the trigger selection circuit is further configured to, if neither the first difference nor the second difference exceed the respective first and second predetermined margins, select a default trigger as the handover trigger.

12. The network node of claim 11 wherein the default trigger comprises a current handover trigger used by the mobile terminal to trigger handover.

13. The network node of claim 10 wherein:
the trigger selection circuit comprises a ranking circuit configured to rank the first and second KPIs based on a preferred emphasis on one of the first and second KPIs; and
the trigger selection circuit is configured to select the handover trigger by:
sequentially executing at least one of the first and second comparisons according to the rank; and
selecting, as the handover trigger, one of the first and second candidate triggers based on one or more of the sequentially executed first and second comparisons.

14. The network node of claim 10 wherein the first KPI comprises one of a number of handover failures, a number of ping-pong handovers, a measurement of a time period where the mobile terminal is not in a preferred cell, a number of handover initiations, a service performance parameter, a Reference Signal Received Power (RSRP), a Signal-plus-Interference to Noise Ratio (SINR), a Signal-to-Noise Ratio (SNR), a handover delay, and a Voice over Internet Protocol (VoIP) performance parameter.

15. The network node of claim 10 wherein the network node comprises the source base station, and wherein the KPI circuit is configured to obtain the first KPI by receiving the first KPI from the mobile terminal for each of the first and second candidate triggers, the network node further comprising a transmitter configured to send the selected handover trigger to the mobile terminal.

16. The network node of claim 10 wherein the network node comprises the source base station, and wherein the KPI circuit is configured to obtain the first KPI by determining the first KPI for each of the first and second candidate triggers, the network node further comprising a transmitter configured to send the selected handover trigger to the mobile terminal for use by the mobile terminal to initiate the handover of the mobile terminal from the source base station to the target base station.

17. The network node of claim 10 wherein the network node comprises the mobile terminal, and wherein the KPI circuit is configured to obtain the first KPI by receiving the first KPI from the source base station for each of the first and second candidate triggers.

18. The network node of claim 10 wherein the network node comprises the mobile terminal, and wherein the KPI circuit is configured to obtain the first KPI by determining the first KPI for each of the first and second candidate triggers.

* * * * *